US012615459B2

(12) United States Patent
Chang et al.

(10) Patent No.: US 12,615,459 B2
(45) Date of Patent: Apr. 28, 2026

(54) OPTICAL COMMUNICATION SYSTEM AND OPTICAL COMMUNICATION METHOD

(71) Applicant: Huawei Technologies Co., Ltd., Shenzhen (CN)

(72) Inventors: Zeshan Chang, Shenzhen (CN); Guangcan Mi, Shenzhen (CN); Han Zhao, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 261 days.

(21) Appl. No.: 18/474,758

(22) Filed: Sep. 26, 2023

(65) Prior Publication Data

US 2024/0015421 A1      Jan. 11, 2024

Related U.S. Application Data

(63) Continuation of application No. PCT/CN2022/076172, filed on Feb. 14, 2022.

(30) Foreign Application Priority Data

Mar. 31, 2021    (CN) .......................... 202110352447.5

(51) Int. Cl.
$H04Q\ 11/00$        (2006.01)
$H04J\ 14/02$        (2006.01)

(52) U.S. Cl.
CPC ...... *H04Q 11/0005* (2013.01); *H04J 14/0212* (2013.01); *H04J 14/0307* (2023.08); *H04Q 2011/0016* (2013.01)

(58) Field of Classification Search
CPC ......... H04Q 11/0005; H04Q 2011/0016; H04J 14/0307; H04J 14/0212

USPC ........................................................ 398/50
See application file for complete search history.

(56) References Cited

U.S. PATENT DOCUMENTS

| | | | |
|---|---|---|---|
| 11,750,317 B2 * | 9/2023 | Kawahara ............ | H04B 10/291 398/50 |
| 2004/0165816 A1 * | 8/2004 | Oikawa .............. | H04Q 11/0005 385/24 |
| 2008/0181605 A1 * | 7/2008 | Palacharla ......... | H04Q 11/0005 398/48 |
| 2009/0232497 A1 * | 9/2009 | Archambault ...... | H04J 14/0297 398/50 |
| 2016/0269809 A1 * | 9/2016 | Jiang .................. | H04Q 11/0005 |
| 2019/0075379 A1 * | 3/2019 | Sato ................... | H04Q 11/0005 |

FOREIGN PATENT DOCUMENTS

| | | |
|---|---|---|
| CN | 101068129 A | 11/2007 |
| CN | 103583010 A | 2/2014 |
| CN | 108683961 A | 10/2018 |
| EP | 2538590 A1 | 12/2012 |

* cited by examiner

*Primary Examiner* — Dalzid E Singh
(74) *Attorney, Agent, or Firm* — Conley Rose, P.C.

(57) ABSTRACT

An optical communication system includes a sending device, an optical cross-connect (OXC) device, and a first receiving device. The sending device is configured to send a modulated first service optical signal to the OXC device. The OXC device is configured to receive the modulated first service optical signal through a first input port, and divide the modulated first service optical signal into N1 first optical signals based on a wavelength. The OXC device is configured to send M1 first optical signals to the first receiving device through M1 first output ports.

20 Claims, 6 Drawing Sheets

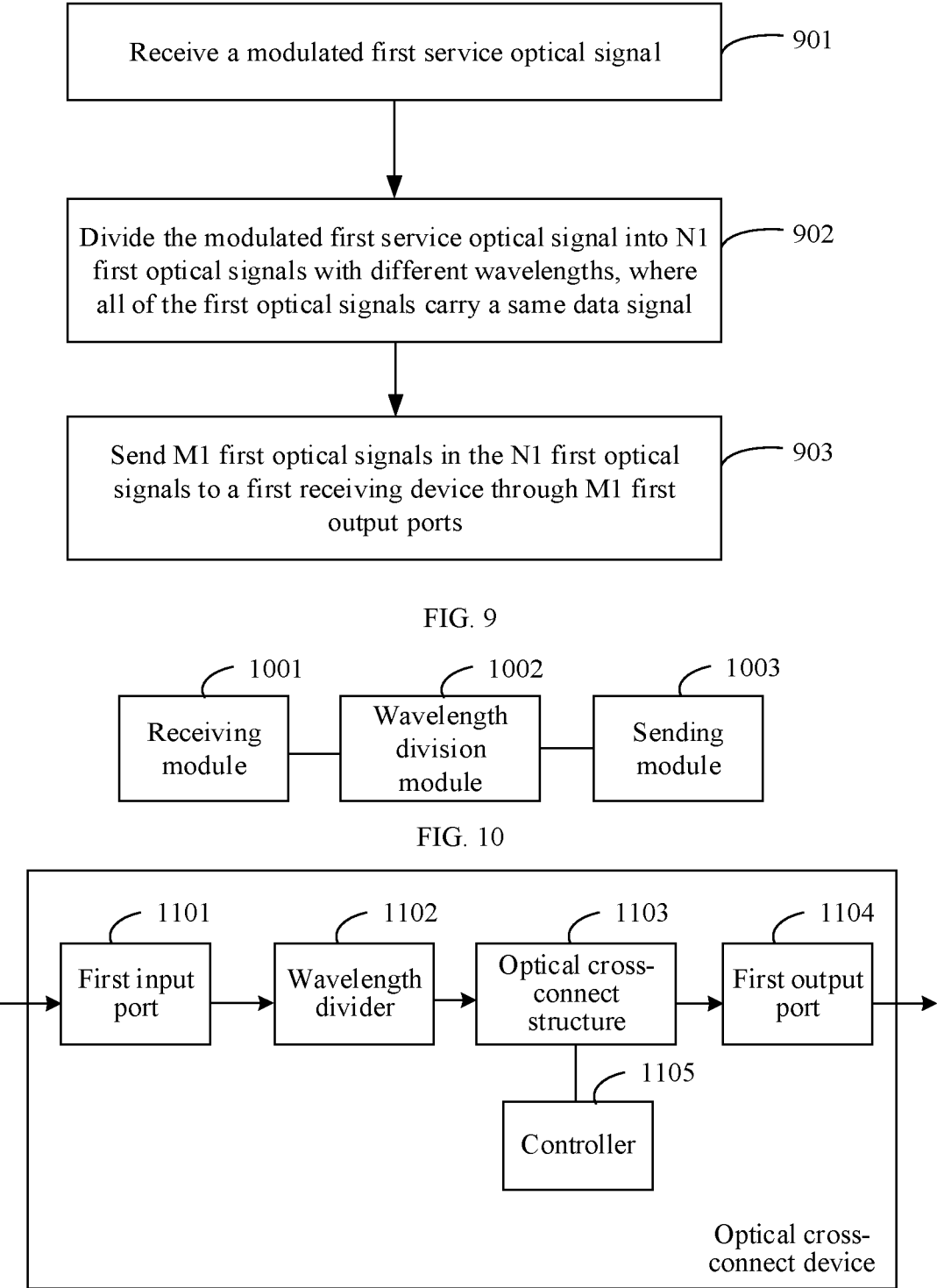

Receive a modulated first service optical signal — 901

Divide the modulated first service optical signal into N1 first optical signals with different wavelengths, where all of the first optical signals carry a same data signal — 902

Send M1 first optical signals in the N1 first optical signals to a first receiving device through M1 first output ports — 903

FIG. 9

1001 Receiving module

1002 Wavelength division module

1003 Sending module

FIG. 10

1101 First input port

1102 Wavelength divider

1103 Optical cross-connect structure

1104 First output port

1105 Controller

Optical cross-connect device

FIG. 11

OPTICAL COMMUNICATION SYSTEM AND OPTICAL COMMUNICATION METHOD

CROSS-REFERENCE TO RELATED APPLICATIONS

This application is a continuation application of International Patent Application No. PCT/CN2022/076172, filed on Feb. 14, 2022, which claims priority to Chinese Patent Application No. 202110352447.5, filed on Mar. 31, 2021. The disclosures of the aforementioned applications are hereby incorporated by reference in their entireties.

TECHNICAL FIELD

This application relates to the field of optical communication, and in particular, to an optical communication system and an optical communication method.

BACKGROUND

Broadcast refers to one-to-many communication. A broadcast communication system includes one sending device and a plurality of receiving devices.

To implement broadcast communication in the field of optical communication, a beam splitter may be disposed between a sending device and the plurality of receiving devices. Specifically, the beam splitter receives a single-wavelength optical signal from the sending device. Then, the beam splitter splits the single-wavelength optical signal into a plurality of optical signals, where all of the plurality of optical signals has same or different power. The beam splitter and the plurality of receiving devices are connected through an optical fiber. The plurality of optical signals output by the beam splitter are transmitted to the plurality of receiving devices through the optical fiber, and the plurality of receiving devices are in one-to-one correspondence with the plurality of optical signals. Because the beam splitter performs power distribution on only the single-wavelength optical signal, all of the plurality of optical signals carries a same data signal, that is, broadcast is implemented.

However, a broadcast communication mode in which the beam splitter is used is not flexible. Specifically, the broadcast communication system cannot control whether the receiving device receives the optical signal.

SUMMARY

This application provides an optical communication system and an optical communication method. An optical cross-connect (OXC) device in this application may select a first output port, and establish a connection relationship between the selected first output port and a first input port, to improve communication flexibility.

A first aspect of this application provides an optical communication system. The optical communication system includes a sending device, an OXC device, and a first receiving device. The sending device is configured to send a modulated first service optical signal to the OXC device. The modulated first service optical signal has N1 different wavelengths, and N1 is an integer greater than 1. The OXC device is a device that uses an OXC technology. For example, the OXC device may be a wavelength selective switch (WSS) or a cascaded WSS. The OXC device is configured to receive the modulated first service optical signal through a first input port. Then, the OXC device divides the modulated first service optical signal into N1 first optical signals with different wavelengths. Each of the first optical signals is a single-wavelength optical signal, and all of the first optical signals carry a same data signal. The data signal may be an analog signal or a digital signal that carries data. The digital signal may be a bit stream including 0 and 1. The OXC device includes M1 first output ports. After obtaining the N1 first optical signals, the OXC device is configured to send M1 first optical signals in the N1 first optical signals to the first receiving device through the M1 first output ports. The M1 first output ports are in one-to-one correspondence with M1 first receiving devices.

In this application, the OXC device may select a first output port, and establish a connection relationship between the selected first output port and the first input port, to send the first optical signal to the first receiving device connected to the first output port, so as to improve communication flexibility.

In an optional manner of the first aspect, the OXC device is configured to select the M1 first output ports from output ports of the OXC device to send the M1 first optical signals. A quantity of output ports of the OXC device is greater than M1. That the OXC device selects the M1 first output ports from output ports means that the OXC device establishes connections between the first input port and the M1 first output ports. The OXC device in this application may flexibly select the M1 first output ports from the output ports of the OXC device, to further improve communication flexibility.

In an optional manner of the first aspect, the OXC device includes a first modulator, and the first modulator is an external modulator. The sending device further includes a first wavelength selector. The first wavelength selector is configured to receive an optical signal with H different wavelengths, and send the first service optical signal to the first modulator. The first service optical signal has N1 different wavelengths, and H is an integer greater than N1. The first modulator is configured to modulate the first service optical signal to obtain the modulated first service optical signal. A wavelength of the first service optical signal may be controlled by using the first wavelength selector, that is, a quantity of first receiving devices that receive the first optical signal is controlled. Therefore, this application further improves communication flexibility. In particular, switching time of the wavelength selector is short, and is generally at a microsecond level. In this application, the first wavelength selector is added to reduce a control delay.

In an optional manner of the first aspect, the optical communication system further includes a second receiving device. The sending device is configured to send a modulated second service optical signal to the OXC device. The modulated second service optical signal has N2 different wavelengths, and N2 is an integer greater than 1. The OXC device is further configured to receive the modulated second service optical signal through a second input port. Then, the OXC device divides the modulated second service optical signal into N2 second optical signals with different wavelengths. Each of the second optical signals is a single-wavelength optical signal, and all of the second optical signals carry a same data signal. The OXC device includes M2 second output ports. After obtaining the N2 second optical signals, the OXC device is configured to send M2 second optical signals in the N2 second optical signals to the second receiving device through the M2 second output ports. The M2 second output ports are in one-to-one correspondence with M2 second receiving devices. Each of the second optical signals and each of the first optical signals carry different data signals. For a receiving device connected to the OXC device, the receiving device may receive the first optical signal, and may also receive the second optical signal. Therefore, this application further improves communication flexibility.

In an optional manner of the first aspect, the OXC device is further configured to select the M2 second output ports from the output ports of the OXC device to send the M2 second optical signals in the N2 second optical signals. A quantity of output ports of the OXC device is greater than M2. That the OXC device selects the M2 second output ports from the output ports means that the OXC device establishes connections between the second input port and the M2 second output ports. The OXC device in this application can flexibly control establishment of connections between the second input port and specific output ports, to further improve communication flexibility. In particular, the M1 first output ports and the M2 second output ports may include a same port or different ports. When the M1 first output ports and the M2 second output ports include the same port, the M1 first output ports and the M2 second output ports may include output ports that are partially the same, or may include ports that are totally the same.

In an optional manner of the first aspect, a target receiving device includes a second wavelength selector and an optical receiving module, and the target receiving device is both the first receiving device and the second receiving device. The second wavelength selector is configured to receive a target optical signal with two different wavelengths from a target output port. The target output port is both the first output port and the second output port. The target optical signal includes one first optical signal and one second optical signal. The second wavelength selector obtains the first optical signal or the second optical signal based on the target optical signal. Then, the second wavelength selector sends the obtained first optical signal or the obtained second optical signal to the optical receiving module. After the target receiving device receives the target optical signal, the target receiving device may control and demodulate the first optical signal or the second optical signal. Therefore, this application further improves communication flexibility. In particular, in this application, the second wavelength selector is added to reduce a control delay.

In an optional manner of the first aspect, the optical communication system is an integrated data communication network (DCN) system.

In an optional manner of the first aspect, M1 is less than or equal to N1.

A second aspect of this application provides an optical communication method. The method includes: An OXC device receives a modulated first service optical signal through a first input port. The modulated first service optical signal has N1 different wavelengths, and N1 is an integer greater than 1. The OXC device divides the modulated first service optical signal into N1 first optical signals with different wavelengths. Each of the first optical signals is a single-wavelength optical signal, and all of the first optical signals carry a same data signal. The OXC device sends M1 first optical signals in the N1 first optical signals to a first receiving device through M1 first output ports.

In an optional manner of the second aspect, the method further includes: The OXC device selects the M1 first output ports from output ports of the OXC device to send the M1 first optical signals.

In an optional manner of the second aspect, the method further includes: The OXC device receives a modulated second service optical signal through a second input port. The modulated second service optical signal has N2 different wavelengths, and N2 is an integer greater than 1. The OXC device divides the modulated second service optical signal into N2 second optical signals with different wavelengths. Each of the second optical signals is a single-wavelength optical signal, and all of the second optical signals carry a same data signal. Each of the second optical signals and each of the first optical signals carry different data signals. The OXC device sends M2 second optical signals in the N2 second optical signals to a second receiving device through M2 second output ports.

In an optional manner of the second aspect, the method further includes: The OXC device selects the M2 second output ports from the output ports of the OXC device to send the M2 second optical signals in the N2 second optical signals. The M1 first output ports and the M2 second output ports include a same port or different ports.

In an optional manner of the second aspect, the OXC device sends a target optical signal with two different wavelengths to a target receiving device through a target output port. The target optical signal includes one first optical signal and one second optical signal. The target optical signal is used by the target receiving device to obtain the first optical signal or the second optical signal. The target receiving device is both the first receiving device and the second receiving device, and the target output port is both the first output port and the second output port.

A third aspect of this application provides an optical communication method. The method includes: A sending device sends a modulated first service optical signal to an OXC device. The modulated first service optical signal has N1 different wavelengths, and N1 is an integer greater than 1. The OXC device receives the modulated first service optical signal through a first input port, and divides the modulated first service optical signal into N1 first optical signals with different wavelengths. Each of the first optical signals is a single-wavelength optical signal, and all of the first optical signals carry a same data signal. The OXC device sends M1 first optical signals in the N1 first optical signals to a first receiving device through M1 first output ports.

In an optional manner of the third aspect, before that the OXC device sends M1 first optical signals in the N1 first optical signals to a first receiving device through M1 first output ports, the method further includes: The OXC device selects the M1 first output ports from output ports of the OXC device to send the M1 first optical signals.

In an optional manner of the third aspect, before that a sending device sends a modulated first service optical signal to an OXC device, the method further includes: The sending device receives an optical signal with H different wavelengths. The sending device obtains a first service optical signal based on the optical signal with the H different wavelengths. The first service optical signal has N1 different wavelengths, and H is an integer greater than N1. The sending device modulates the first service optical signal to obtain the modulated first service optical signal.

In an optional manner of the third aspect, the method further includes: The sending device modulates a second service optical signal to obtain a modulated second service optical signal. The modulated second service optical signal has N2 different wavelengths, and N2 is an integer greater than 1. The sending device sends the modulated second service optical signal to the OXC device. The OXC device receives the modulated second service optical signal through a second input port, and divides the modulated second service optical signal into N2 second optical signals with different wavelengths. Each of the second optical signals is a single-wavelength optical signal, and all of the second optical signals carry a same data signal. Each of the second optical signals and each of the first optical signals carry different data signals. The OXC device sends M2 second optical signals in the N2 second optical signals to a second receiving device through M2 second output ports.

In an optional manner of the third aspect, the OXC device selects the M2 second output ports from the output ports of the OXC device to send the M2 second optical signals in the N2 second optical signals. The M1 first output ports and the M2 second output ports include a same port or different ports.

In an optional manner of the third aspect, the method further includes: A target receiving device receives a target optical signal with two different wavelengths from a target output port. The target optical signal includes one first optical signal and one second optical signal. The target receiving device obtains the first optical signal or the second optical signal based on the target optical signal. The target receiving device is both the first receiving device and the second receiving device. The target output port is both the first output port and the second output port.

A fourth aspect of this application provides an optical communication apparatus. The optical communication apparatus includes a receiving port, a wavelength divider, and a sending port. The receiving port is configured to receive a modulated first service optical signal through a first input port. The modulated first service optical signal has N1 different wavelengths, and N1 is an integer greater than 1. The wavelength divider is configured to divide the modulated first service optical signal into N1 first optical signals with different wavelengths. Each of the first optical signals is a single-wavelength optical signal, and all of the first optical signals carry a same data signal. The sending port is configured to send M1 first optical signals in the N1 first optical signals to a first receiving device through M1 first output ports.

In an optional manner of the fourth aspect, the apparatus further includes a controller and an OXC structure. The controller is configured to control the OXC structure based on a control signal, to enable the first input port to be connected to the M1 first output ports by using the OXC structure.

In an optional manner of the fourth aspect, the receiving port is further configured to receive a modulated second service optical signal through a second input port. The modulated second service optical signal has N2 different wavelengths, and N2 is an integer greater than 1. The wavelength divider is further configured to divide the modulated second service optical signal into N2 second optical signals with different wavelengths. Each of the second optical signals is a single-wavelength optical signal. All of the second optical signals carry a same data signal. Each of the second optical signals and each of the first optical signals carry different data signals. The sending port is further configured to send M2 second optical signals in the N2 second optical signals to a second receiving device through M2 second output ports.

In an optional manner of the fourth aspect, the sending port is configured to send a target optical signal with two different wavelengths to a target receiving device from a target output port. The target optical signal includes one first optical signal and one second optical signal. The target optical signal is used by the target receiving device to obtain the first optical signal or the second optical signal. The target receiving device is both the first receiving device and the second receiving device. The target output port is both the first output port and the second output port.

In an optional manner of the fourth aspect, a module in the optical communication apparatus is further configured to perform an operation performed by the OXC device in any one of the second aspect or the implementations of the second aspect.

A fifth aspect of this application provides an optical communication device. The optical communication device includes a first input port, a wavelength divider, an OXC structure, a controller, and a first output port. The first input port is configured to receive a modulated first service optical signal. The modulated first service optical signal has N1 different wavelengths, and N1 is an integer greater than 1. The wavelength divider is configured to divide the modulated first service optical signal into N1 first optical signals with different wavelengths. Each of the first optical signals is a single-wavelength optical signal, and all of the first optical signals carry a same data signal. The controller is configured to receive a control signal, and control the OXC structure based on the control signal, to enable the first input port to be connected to M1 first output ports by using the OXC structure. The M1 first output ports are configured to output M1 first optical signals in the N1 first optical signals.

In an optional manner of the fifth aspect, the optical communication device is further configured to perform an operation performed by the OXC device in any one of the second aspect or the implementations of the second aspect.

A sixth aspect of this application provides a computer storage medium. The computer storage medium stores instructions, and when the instructions are executed on a computer, the computer is enabled to perform the method according to any one of the second aspect or the implementations of the second aspect.

A seventh aspect of this application provides a computer program product. When the computer program product is executed on a computer, the computer is enabled to perform the method according to any one of the second aspect or the implementations of the second aspect.

BRIEF DESCRIPTION OF DRAWINGS

FIG. 9 is another schematic flowchart of an optical communication method according to this application;

FIG. 10 is a schematic structural diagram of an optical communication apparatus according to this application; and FIG. 11 is a schematic structural diagram of an OXC device according to this application.

DESCRIPTION OF EMBODIMENTS

This application provides an optical communication system and an optical communication method, and is applied to the field of optical communication. An OXC device in this application may select a first output port, and establish a connection relationship between the selected first output port and a first input port, to improve communication flexibility.

It should be understood that in the descriptions of embodiments of this application, "first", "second", and the like are merely used for distinguishing descriptions, and cannot be understood as indicating or implying relative importance, and cannot be understood as indicating or implying a sequence. In addition, for brevity and clarity, reference numbers and/or letters are repeated in embodiments of this application. Repetition is not indicative of a strictly limiting relationship between the various embodiments and/or configurations.

Figures 1, 2:
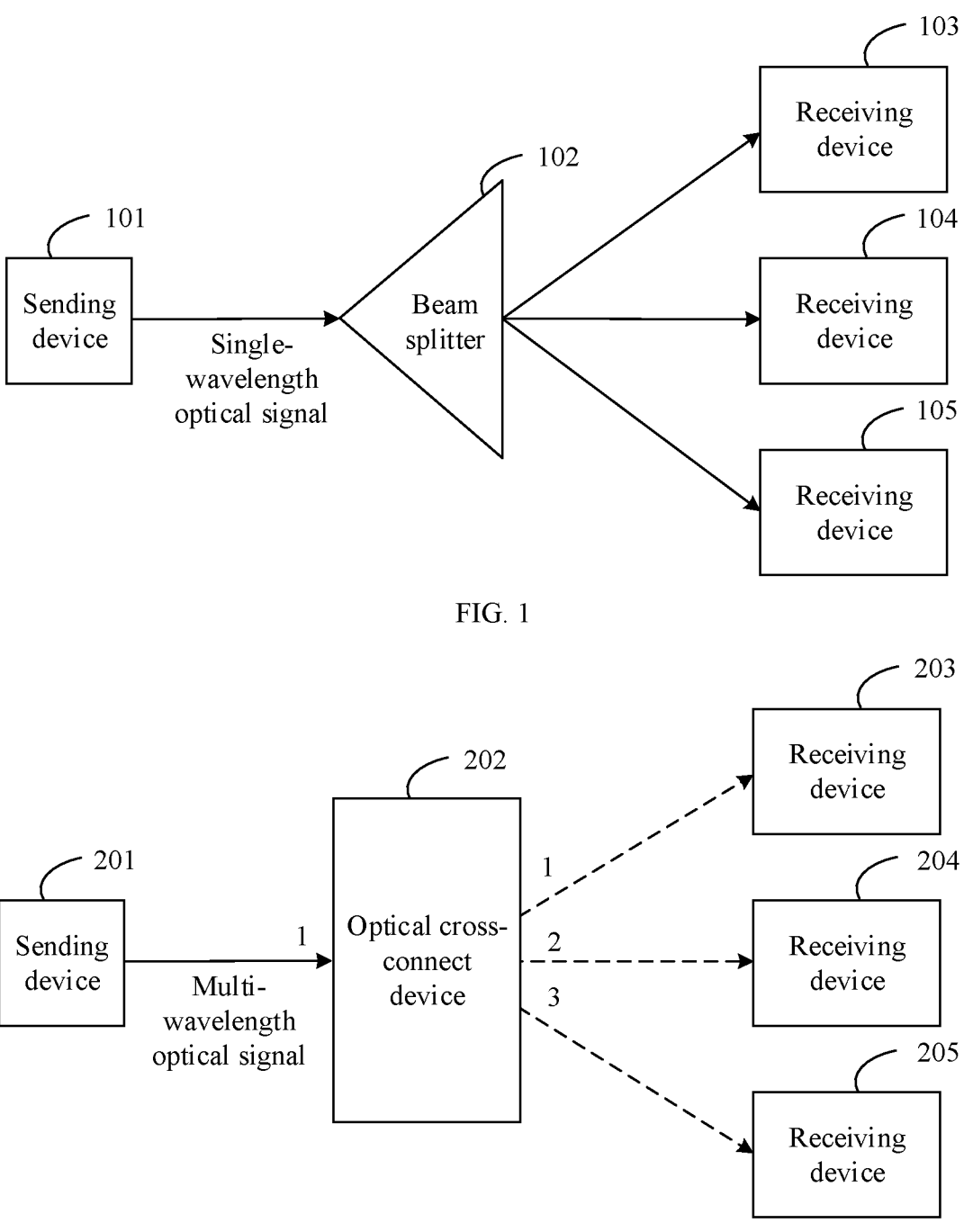
FIG. 1 is a schematic structural diagram of a broadcast communication system in the field of optical communication.
FIG. 2 is a schematic structural diagram of an optical communication system according to this application.

FIG. 1 is a schematic structural diagram of a broadcast communication system in the field of optical communication. As shown in FIG. 1, the broadcast communication system includes a sending device 101, a beam splitter 102, a receiving device 103, a receiving device 104, and a receiving device 105. The sending device 101 sends a single-wavelength optical signal to the beam splitter 102. The beam splitter 102 splits the single-wavelength optical signal into three optical signals. All of the three optical signals have same power. The beam splitter 102 and the receiving devices 103 to 105 are connected through optical fibers. The three optical signals output by the beam splitter 102 are transmitted to the receiving devices 103 to 105 through the optical fibers. The receiving devices 103 to 105 are in one-to-one correspondence with the three optical signals. Because the beam splitter 102 performs power distribution on only the single-wavelength optical signal, all of the three optical signals carry a same data signal.

However, a broadcast communication mode in which the beam splitter is used is not flexible. In an example, a beam splitter generally includes non-adjustable optical elements. When a single-wavelength optical signal is input to an input port of the beam splitter, each output port of the beam splitter outputs an optical signal. The output port of the beam splitter is connected to receiving devices through optical fibers. When the beam splitter has an input, each of the receiving devices receives an optical signal. Therefore, the broadcast communication system using the beam splitter cannot select receiving devices to receive an optical signal. For example, in FIG. 1, the beam splitter 102 cannot select some of the receiving devices 103 to 105 to send an optical signal, but sends optical signals to all the receiving devices 103 to 105.

Therefore, this application provides an optical communication system. FIG. 2 is a schematic structural diagram of an optical communication system according to this application. As shown in FIG. 2, the optical communication system includes a sending device 201, an OXC device 202, a receiving device 203, a receiving device 204, and a receiving device 205. The OXC device 202 includes an input port 1, an output port 1, an output port 2, and an output port 3. The input port 1 is connected to the receiving device 203, the input port 2 is connected to the receiving device 204, and the input port 3 is connected to the receiving device 205. It should be understood that the schematic structural diagram of the optical communication system in FIG. 2 is merely an example. During actual application, the OXC device may be connected to the receiving device through more or fewer output ports.

The sending device 201 is configured to send a multi-wavelength optical signal to the OXC device 202. The multi-wavelength optical signal is also referred to as a modulated first service optical signal. The modulated first service optical signal has N1 different wavelengths, and N1 is an integer greater than 1. The OXC device 202 is configured to receive the modulated first service optical signal through the input port 1 (also referred to as a first input port), and divide the modulated first service optical signal into N1 first optical signals with different wavelengths. For ease of description, this is also referred to as that the OXC device 202 performs wavelength division on the modulated first service optical signal to obtain the N1 first optical signals. Each of the first optical signals is a single-wavelength optical signal, and all of the first optical signals carry a same data signal. The data signal may be an analog signal or a digital signal that carries data, and the digital signal may be a bit stream including 0 and 1. After the N1 first optical signals are obtained through the wavelength division, the OXC device 202 is configured to send M1 first optical signals in the N1 first optical signals to M1 first receiving devices through M1 first output ports. The M1 first output ports are in one-to-one correspondence with the M1 first receiving devices.

The first output port is an output port to which a connection to the first input port is established. The first receiving device is a receiving device that receives the first optical signal. For example, if the receiving device 203 receives the first optical signal, the receiving device 203 is the first receiving device. In this case, the output port 1 of the OXC device 202 connected to the receiving device 203 is the first output port. The OXC device 202 may select a first output port, and establish a connection relationship between the selected first output port and the first input port, to send the first optical signal to the first receiving device connected to the first output port. In an example, the OXC device 202 may control establishment of connections between the first input port and specific output ports, and further control which output ports are used as the first output ports. In addition, the output ports are in one-to-one correspondence with the receiving devices. Therefore, the OXC device 202 may control whether the receiving device receives the first optical signal. In an example, the following describes the OXC device 202.

The OXC device 202 is a device using an OXC technology. For example, the OXC device may be a cascaded WSS, a WSS, a combination of an AWG and a MEMS, or the like. Descriptions are separately provided below.

Figure 3A:
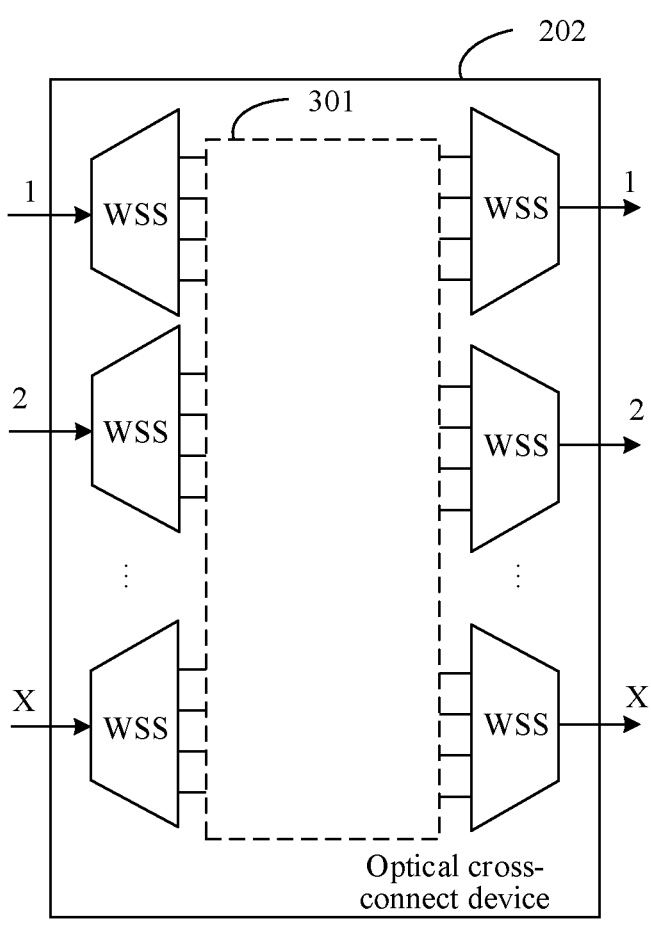
FIG. 3A is a schematic structural diagram of an OXC device according to this application.

FIG. 3A is a schematic structural diagram in which an OXC device is a cascaded WSS according to this application. As shown in FIG. 3A, the OXC device 202 includes X input ports and X output ports. Each of the input ports is used as an input port of one input WSS, and a total of X input WSSs are included. The following uses a 1×4 cascaded WSS as an example for related description. Each input WSS includes one input port and four output ports. When the input WSS receives a modulated service optical signal with four wavelengths through the input port, the input WSS divides the modulated service optical signal into four single-wavelength optical signals with different wavelengths. The four single-wavelength optical signals are input to an OXC structure 301 through the four output ports of the input WSS. The OXC device 202 controls an internal connection relationship of the OXC structure 301, so that the four optical signals may reach any one or more output WSSs. The OXC structure 301 may be an optical backplane. In the optical backplane, the four optical signals are transmitted to the output WSS through optical fibers or waveguides. Because a specific structure of the OXC structure 301 may change with a quantity of ports of the OXC device, the structure of the OXC structure 301 is not limited in this application. In addition, an output port of each output WSS serves as an output port of the OXC device 202. The internal connection relationship of the OXC structure 301 is controlled, so that the four optical signals may reach any one or more output ports. Therefore, when the OXC device is the cascaded WSS, the OXC device may control establishment of connections between the input port and specific output ports.

For example, for the input port 1, the input port 1 inputs a modulated first service optical signal with four wavelengths. The input port 1 is connected to an input WSS 1. The input WSS 1 divides the modulated first service optical signal into four single-wavelength first optical signals with different wavelengths. The four single-wavelength first optical signals include λ1, λ2, λ3, and λ4. The OXC device includes output ports 1 to 10. The output ports 1 to 10 include four first output ports. The four first output ports output four first optical signals with different wavelengths, and each of the first output ports outputs one first optical signal. The four first output ports may include the output ports 1 to 4. In this case, the four first optical signals are obtained based on the modulated first service optical signal, and the service optical signal is input from the input port 1. Therefore, the OXC device establishes connections between the input port 1 and the output ports 1 to 4. For ease of understanding, the examples herein are still used in subsequent descriptions of this application.

Figure 3B:
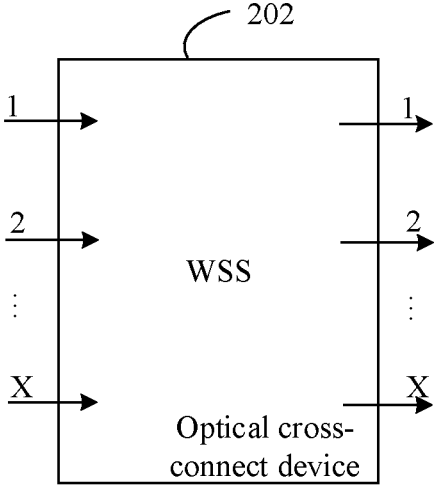
FIG. 3B is a schematic structural diagram in which an OXC device is a WSS according to this application.

FIG. 3B is a schematic structural diagram in which an OXC device is a WSS according to this application. As shown in FIG. 3B, the OXC device 202 includes X input ports and X output ports. The WSS may establish a connection relationship between any input port and an output port. The following describes the OXC device by using a WSS including a liquid crystal on silicon (LCOS) as an example. The WSS includes X input ports, a periodic grating, an LCOS, a Fourier lens, and X output ports. Any input port inputs a modulated first service optical signal. The modulated first service optical signal has N1 different wavelengths. The periodic grating is configured to divide the modulated first service optical signal into N1 first optical signals with different wavelengths. The first optical signals with different wavelengths are emitted from the periodic grating at different angles. The N1 first optical signals are incident to different areas of the LCOS. The LCOS forms an equivalent grating. Grayscale distribution of gratings in different areas of the LCOS is adjusted, so that a first optical signal with a corresponding wavelength can be controlled to implement angle deflection. The angle-deflected first optical signal is incident on the Fourier lens. The Fourier lens shifts a location of the first optical signal. The first optical signal whose location is shifted is coupled to a specific output port for output. Grayscale distribution of gratings in an area of the LCOS is controlled, so that a first optical signal incident to the area can be output from different output ports. For example, λ1 is output from the output port 2. Therefore, when the OXC device is the WSS, the OXC device may control establishment of connections between a first input port and specific output ports.

Figure 3C:
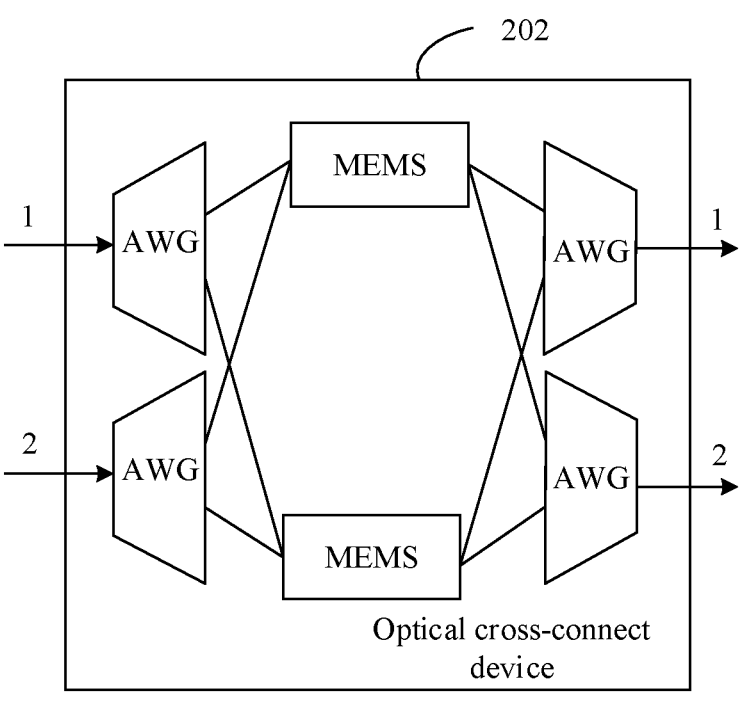
FIG. 3C is a schematic structural diagram in which an OXC device is a combination of an arrayed-waveguide grating (AWG) and a micro-electro-mechanical systems (MEMS) according to this application.

FIG. 3C is a schematic structural diagram in which an OXC device is a combination of an AWG and a MEMS according to this application. As shown in FIG. 3C, the OXC device 202 includes two input ports and two output ports. Each of the input ports is used as an input port of one input AWG, and a total of two input AWGs are included. The following uses a 1×2 AWG as an example for related description. Each input AWG includes one input port and two output ports. When the input AWG receives a modulated service optical signal with two wavelengths through the input port, the input AWG divides the modulated service optical signal into two single-wavelength first optical signals with different wavelengths. The two first optical signals are input to different MEMSs through the two output ports of the input AWG. The MEMS may control whether the first optical signal reaches an output AWG. The first optical signal reaching the output AWG is output from a corresponding output port. Therefore, when the OXC device is the combination of the AWG and the MEMS, the OXC device may control establishment of connections between the first input port and specific output ports. It should be understood that the OXC device in FIG. 3C is merely an example of a combination of an AWG and a MEMS. During actual application, an OXC device formed by a combination of an AWG and a MEMS may have more input ports or output ports.

It can be learned from the foregoing descriptions that the OXC device may control establishment of connections between the input port and specific output ports. Therefore, the OXC device 202 may be configured to select the M1 first output ports from the output ports of the OXC device to send the M1 first optical signals. The M1 first optical signals are obtained based on the modulated first service optical signal, and the modulated first service optical signal is received by the OXC device through the first input port. Therefore, that the OXC device selects the M1 first output ports to send the M1 first optical signals may also be understood as that the OXC device establishes connections between the first input port and the M1 first output ports. The OXC device in FIG. 2 is used as an example. The first input port is the input port 1. The OXC device includes X output ports, where X is greater than or equal to M1. The OXC device establishes connections between the input port 1 and the M1 first output ports. The M1 first output ports are any M1 output ports in the X output ports.

In addition to establishing the connections between the first input port and the M1 first output ports, the OXC device may further change the connections between the first input port and the M1 first output ports. Before the connections between the first input port and the M1 first output ports are changed, the M1 first optical signals are output from the M1 first output ports. After the connections between the first input port and the M1 first output ports are changed, the M1 first optical signals are output from M1 third output ports. The M1 third output ports are any M1 output ports in the X output ports. The M1 first output ports and the M1 third output ports may have output ports that are partially the same, or may not have a same port. For example, after the OXC device establishes the connections between the input port 1 and the output ports 1 to 4, the OXC device changes the connections between the input port 1 and the output ports 1 to 4, so that connections are established between the input port 1 and the output ports 3 to 6. In this case, the M1 first output ports and the M1 third output ports have output ports that are partially the same (that is, the output port 3 and the output port 4).

If an output port is used as a filtering port of the OXC device, the OXC device also has a filtering capability. For example, it is assumed that the output ports 1 to 10 include a first output port and a filtering port. The first output port outputs $\lambda 1$, and the filtering port outputs $\lambda 2$, $\lambda 3$, and $\lambda 4$. In this case, the OXC device discards $\lambda 2$, $\lambda 3$, and $\lambda 4$, and the OXC device actually outputs $\lambda 1$. In this case, the modulated first service optical signal has four wavelengths, that is, N1 is equal to 4. However, because the OXC device discards $\lambda 2$, $\lambda 3$, and $\lambda 4$, the OXC device has only one first output port to output $\lambda 1$, that is, M1 is equal to 1. In this case, M1 is less than N1.

It should be understood that, during actual application, M1 may be greater than N1. For example, the modulated first service optical signal has four wavelengths, namely, $\lambda 1$, $\lambda 2$, $\lambda 3$, and $\lambda 4$. The OXC structure 301 includes a beam splitter. The beam splitter is configured to split $\lambda 1$ into $\lambda 11$ and $\lambda 12$. The output ports 1 to 5 output $\lambda 2$, $\lambda 3$, $\lambda 4$, $\lambda 11$, and $\lambda 12$ respectively. In this case, M1 is equal to 5, and N1 is equal to 4. It should be understood that the foregoing merely describes an example of the OXC device, and a specific structure of the OXC device is not limited in this application. In addition, during actual application, a person skilled in the art may adaptively modify the structure of the OXC device based on a requirement. After adaptive modification, the OXC device should fall within the protection scope of this application, provided that the OXC device can control establishment of connections between the first input port and specific output ports. The adaptive modification includes, but is not limited to, any one or more of the following modifications. For example, $\lambda 1$ is bound to the output port 1, $\lambda 1$ is fixedly set for the output port 1, and connections may be established between $\lambda 2$, $\lambda 3$, and $\lambda 4$ and any three of the output ports 2 to 10. For example, the OXC device does not include a filtering port, that is, each output port of each OXC device is connected to a receiving device. For example, a quantity of output ports of the OXC device is greater than a quantity of input ports.

In this application, the OXC device may control establishment of connections between the first input port and specific output ports, to control whether a receiving device connected to the output port receives the first optical signal, so as to improve communication flexibility. In FIG. 2, for an output port, the OXC device may control, in two manners, whether a connection is established between the output port and the first input port. This is described separately below.

The first manner is a transfer manner. For example, before the connections between the input port 1 and the M1 first output ports are changed, connections are established between the input port 1 and the output ports 1 to 4. After the connections between the input port 1 and the M1 first output ports are changed, connections are established between the input port 1 and the output ports 2 to 5. The first optical signal in the output port 1 is transferred to the output port 5. For the output port 1, it may be understood that a connection relationship between the output port 1 and the input port 1 is changed through transfer.

The second manner is a filtering manner. For example, before the connections between the input port 1 and the M1 first output ports are changed, connections are established between the input port 1 and the output ports 1 to 4. After the connections between the input port 1 and the M1 first output ports are changed, connections are established between the input port 1 and the output ports 2 to 4 and 10.

The output port 1 is a filtering port of the OXC device. The first optical signal in the output port 1 is transferred to the output port 10, and then is filtered or discarded by the OXC device. For the output port 1, it may be understood that a connection relationship between the output port 1 and the input port 1 is changed through filtering. It should be understood that in the foregoing two manners, because optical signals with the wavelengths $\lambda 1$, $\lambda 2$, $\lambda 3$, and $\lambda 4$ carry a same data signal, a wavelength factor is ignored herein.

Regardless of the transfer manner or the filtering manner, the OXC device needs to change the connection relationship between the input port and the output port, which is also referred to as port switching. Port switching time of a wavelength selector is short, and is generally at a microsecond level. In this application, a first wavelength selector is added to the sending device to reduce a control delay. A wavelength selector 401 may be a Mach-Zehnder MZI switch, a microring switch, a variable optical attenuator (VOA) switch matrix, a semiconductor optical amplifier (SOA) switch matrix, or the like.

Figure 4:
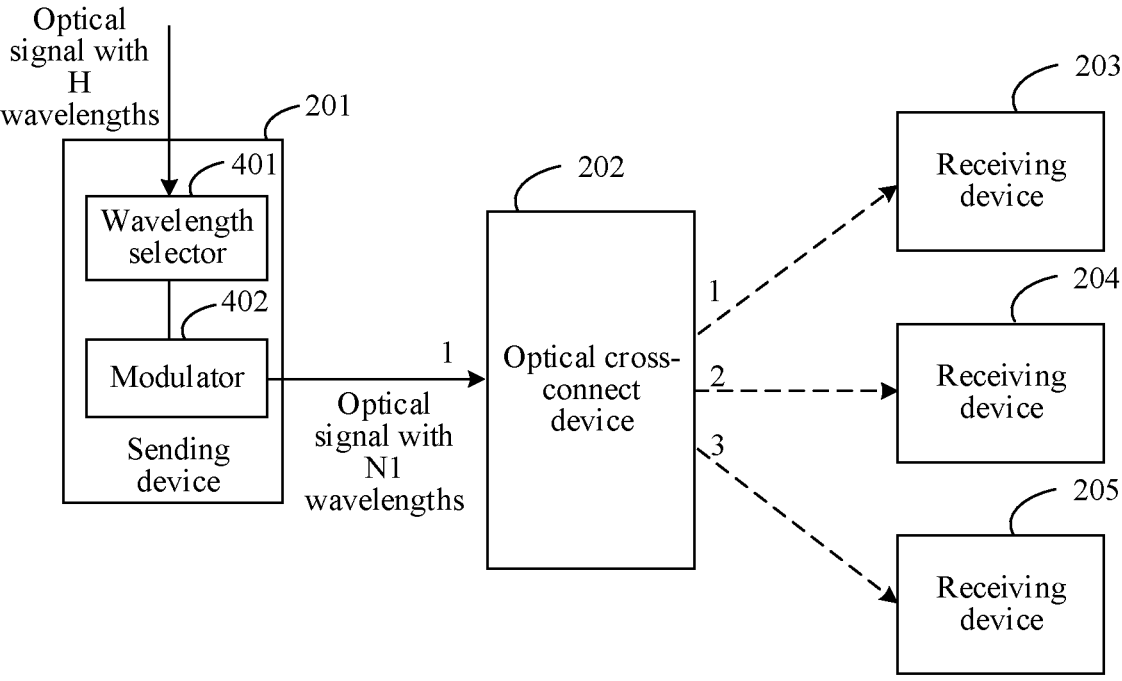
FIG. 4 is a schematic structural diagram of an optical communication system including a first wavelength selector according to this application.

FIG. 4 is a schematic structural diagram of an optical communication system including a first wavelength selector according to this application. As shown in FIG. 4, the optical communication system includes a sending device 201, an OXC device 202, a receiving device 203, a receiving device 204, and a receiving device 205. The sending device 201 includes a wavelength selector 401 and a modulator 402.

The modulator 402 is an external modulator. The wavelength selector 401 (also referred to as a first wavelength selector) is configured to receive an optical signal with H wavelengths. The wavelength selector 401 filters the received optical signal with the H wavelengths to obtain a first service optical signal with N1 wavelengths. H is an integer greater than N1. After obtaining the first service optical signal, the wavelength selector 401 sends the first service optical signal to the modulator 402 (also referred to as a first modulator). The modulator 402 modulates the first service optical signal to obtain a modulated first service optical signal. The modulated first service optical signal is an optical signal with the N1 wavelengths. The modulator 402 sends the modulated first service optical signal to the OXC device 202. The OXC device 202 is configured to receive the modulated first service optical signal through an input port 1, and divide the modulated first service optical signal into N1 first optical signals with different wavelengths. After obtaining the N1 first optical signals, the OXC device 202 is configured to send M1 first optical signals in the N1 first optical signals to M1 first receiving devices through M1 first output ports.

A wavelength of the first service optical signal may be controlled by using the first wavelength selector, that is, a quantity of first receiving devices that receive the first optical signal is controlled. Alternatively, a function similar to the foregoing filtering manner is implemented by using the first wavelength selector. Compared with the foregoing filtering manner, the first wavelength selector can not only reduce a control delay, but also improve utilization of an output port of the OXC device. For example, when the OXC device includes output ports 1 to 10, the output port 10 in the OXC device is used as a filtering port. In this case, the OXC device can be connected to a maximum of nine receiving devices. When the first wavelength selector in this application is used, the OXC device may not use the output port 10 as the filtering port. In this case, the output port 10 may be connected to the receiving device. The OXC device can be connected to a maximum of 10 receiving devices. Therefore, in this embodiment of this application, utilization of the output port of the OXC device can be improved.

It should be understood that, on an optical transmission path in FIG. 4, the wavelength selector 401 is located before the modulator 402. In this case, the wavelength selector 401 receives the optical signal with the H wavelengths. The optical signal with the H wavelengths is an unmodulated optical signal. A frequency bandwidth of a signal with each wavelength of the optical signal with the H wavelengths is less than that of the modulated first service optical signal. Therefore, it is beneficial for the wavelength selector 401 to perform filtering processing, and a filtering loss is reduced.

During actual application, the wavelength selector 401 may alternatively be located after the modulator 402. In an example, the modulator 402 modulates the optical signal with the H wavelengths to obtain the modulated first service optical signal with the H wavelengths. The modulator 402 sends the modulated first service optical signal with the H wavelengths to the wavelength selector 401. The wavelength selector 401 performs filtering processing on the modulated first service optical signal with the H wavelengths to obtain the modulated first service optical signal with the N1 wavelengths. The wavelength selector 401 sends the modulated first service optical signal with the N1 wavelengths to the OXC device 202. The OXC device 202 performs subsequent corresponding processing on the modulated first service optical signal. For details, refer to related descriptions in the embodiment corresponding to FIG. 2 or FIG. 4. It should be understood that when the wavelength selector 401 is located after the modulator 402, the modulator 402 may be an external modulator, or may be an internal modulator.

In this application, the sending device may further include a laser. The laser is configured to generate a light source. For example, in the foregoing embodiment including the wavelength selector 401, the laser is configured to generate the optical signal with the H wavelengths, and send the optical signal with the H wavelengths to the modulator 402 or the wavelength selector 401.

Figure 5:
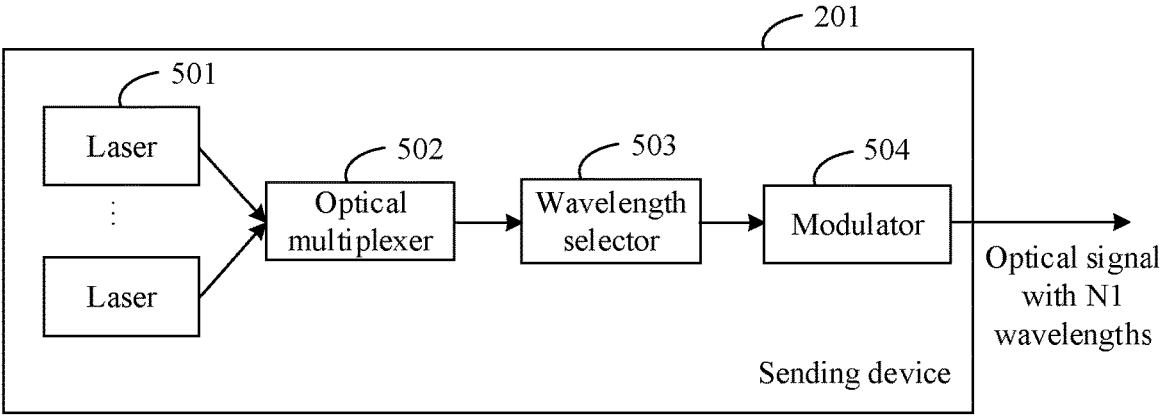
FIG. 5 is a schematic structural diagram of a sending device according to this application.

In another embodiment, the optical communication system is an integrated DCN system. Compared with a communication system in a common household, the DCN system needs to have a more flexible control capability. Correspondingly, the optical communication system in this application can improve communication flexibility. In addition, more receiving devices exist in the DCN system. Therefore, the modulated first service optical signal needs to have more wavelengths, that is, a value of N1 is larger. For example, N1 is 80, 120, or 240. Therefore, when one laser generates limited wavelengths, the sending device includes a plurality of lasers. FIG. 5 is a schematic structural diagram of a sending device according to this application. As shown in FIG. 5, the sending device 201 includes a plurality of lasers 501, an optical multiplexer 502, a wavelength selector 503, and a modulator 504.

The plurality of lasers 501 are configured to generate a plurality of optical signals, where bands of the plurality of optical signals are different. A band may include one or more wavelengths. A sum of wavelength ranges of the plurality of optical signals is equal to a wavelength range of the optical signal with the H wavelengths. The optical multiplexer 502 is configured to multiplex a plurality of optical signals to obtain the optical signal with the H wavelengths. The wavelength selector 503 is configured to filter the received optical signal with the H wavelengths to obtain the first service optical signal with the N1 wavelengths. Then, the modulator 504 is configured to modulate the first service optical signal to obtain the modulated first service optical signal. The sending device 201 sends the modulated first service optical signal to the OXC device 202. For subsequent descriptions of the OXC device 202, refer to related descriptions in the embodiment corresponding to FIG. 2 or FIG. 4.

It should be understood that the sending device 201 may include the wavelength selector 503, or may not include the wavelength selector 503. When the sending device 201 does not include the wavelength selector 503, the optical multiplexer 502 is configured to multiplex the plurality of optical signals to obtain the first service optical signal with the N1 wavelengths. The modulator 504 is configured to modulate the first service optical signal to obtain the modulated first service optical signal.

In another embodiment, M1 is less than a quantity of receiving devices in the optical communication system. In this case, the optical communication system may implement multicast communication or unicast communication based on broadcast communication. It can be learned from the foregoing descriptions in FIG. 1 that all the receiving devices connected to the beam splitter 102 receive an optical signal (if the receiving device discards a demodulated optical signal, this is also understood that the receiving device receives the optical signal), and the broadcast communication system cannot control the receiving device not to receive the optical signal. Therefore, the broadcast communication system in which the beam splitter is used can implement only broadcast communication. However, in this embodiment of this application, the OXC device may control whether the receiving device 203 receives the first optical signal. Therefore, when some receiving devices do not receive the first optical signal, the optical communication system in this application implements multicast communication. When only one receiving device receives the first optical signal, the optical communication system in this application implements unicast communication.

In the foregoing embodiment, the sending device 201 establishes a connection to the first input port of the OXC device 202. During actual application, the sending device 201 may further establish a connection to the second input port of the OXC device 202. This is described below.

Figure 6:
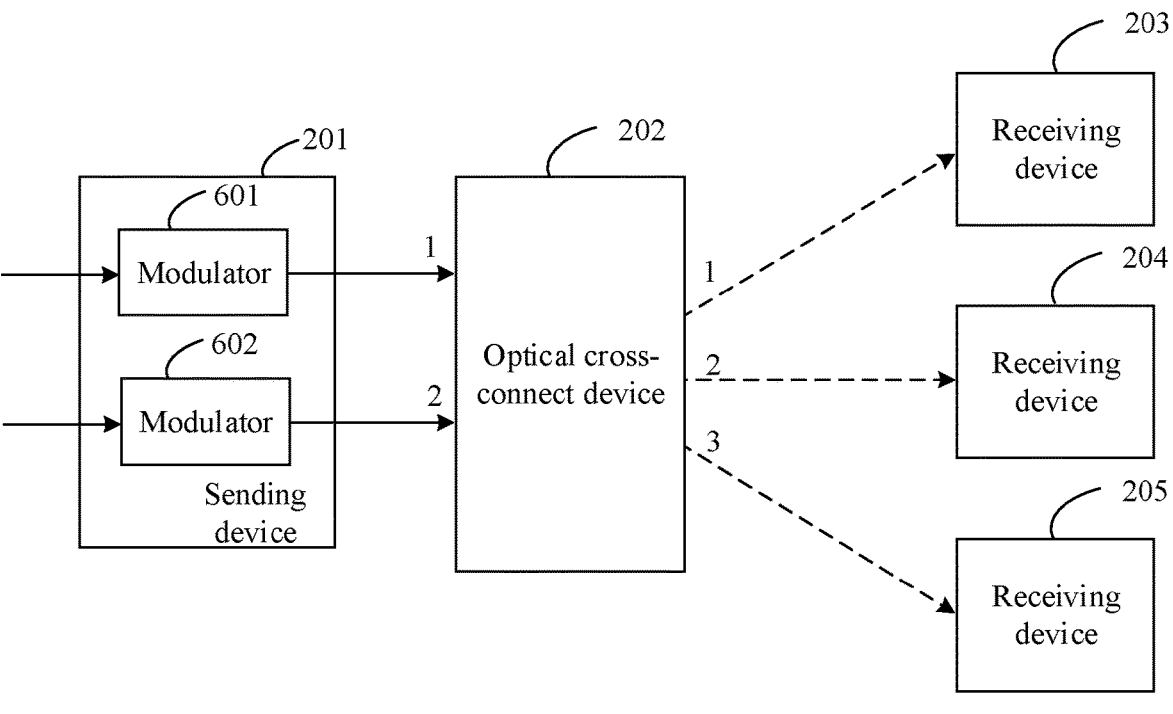
FIG. 6 is a schematic structural diagram of an optical communication system including two modulators according to this application.

FIG. 6 is a schematic structural diagram of an optical communication system including two modulators according to this application. As shown in FIG. 6, the optical communication system includes a sending device 201, an OXC device 202, a receiving device 203, a receiving device 204, and a receiving device 205. The sending device 201 includes a modulator 601 and a modulator 602. The modulator 601 sends a modulated first service optical signal to a first input port of the OXC device 202. For descriptions of the modulator 601, refer to the descriptions in the embodiment corresponding to FIG. 4 or FIG. 5. For processing on the modulated first service optical signal, refer to the descriptions in the embodiment corresponding to FIG. 4 or FIG. 5. The modulator 602 is described below.

The modulator 602 is configured to modulate a second service optical signal to obtain a modulated second service optical signal. The OXC device 202 is configured to receive the modulated second service optical signal through an input port 2 (also referred to as a second input port). The modulated second service optical signal has N2 different wavelengths, and N2 is an integer greater than 1. The OXC device is configured to divide the modulated second service optical signal into N2 second optical signals with different wavelengths. Each of the second optical signals is a single-wavelength optical signal, all of the second optical signals carry a same data signal, and each of the second optical signals and each of first optical signals carry different data signals. After obtaining the N2 second optical signals, the OXC device is further configured to send M2 second optical signals in the N2 second optical signals to a second receiving device through M2 second output ports. The M2 second output ports are in one-to-one correspondence with M2 second receiving devices.

The second output port is an output port that establishes a connection to the second input port. The second receiving device is a receiving device that receives the second optical signal. For example, if the receiving device 203 receives the second optical signal, the receiving device 203 is the second receiving device. In this case, an output port 2 of the OXC device 202 connected to the receiving device 203 is the second output port. The OXC device 202 may control establishment of connections between the second input port and specific output ports, and further control which output ports are used as the second output ports. In addition, the output ports are in one-to-one correspondence with the receiving devices. Therefore, the OXC device 202 may control whether the receiving device receives the second optical signal.

For descriptions of the modulator 602, refer to related descriptions of the modulator 402 in FIG. 4. For example, the modulator 602 is further connected to a wavelength selector. The wavelength selector is configured to filter an optical signal with a plurality of wavelengths to obtain a second service optical signal. The modulator 602 is configured to modulate the second service optical signal to obtain a modulated second service optical signal. For a process of processing the modulated second service optical signal by the OXC device 202, refer to the foregoing process of processing the modulated first service optical signal by the OXC device. For example, in addition to establishing the connections between the second input port and the M2 second output ports, the OXC device 202 may further change the connections between the second input port and the M2 second output ports.

It should be understood that in FIG. 6, the modulator 601 and the modulator 602 belong to the sending device 201. During actual application, the modulator 601 and the modulator 602 may belong to different sending devices. In an example, a first sending device includes a modulator 601, and the modulator 601 is connected to an input port 1 of the OXC device 202. A second sending device includes a modulator 602, and the modulator 602 is connected to the input port 2 of the OXC device 202.

In this embodiment of this application, each of the second optical signals and each of the first optical signals carry different data signals. For the receiving device connected to the OXC device, the receiving device may be used as the first receiving device, and may also be used as the second receiving device. Therefore, the receiving device may receive the first optical signal, and may also receive the second optical signal. Therefore, this application further improves communication flexibility.

It can be learned from the foregoing descriptions that the receiving device may be used as the first receiving device, and may also be used as the second receiving device. When the receiving device is used as both the first receiving device and the second receiving device, the receiving device is a target receiving device. The target receiving device receives a target optical signal. The target optical signal includes one first optical signal and one second optical signal. For example, in FIG. 6, if the receiving device 204 receives both the first optical signal and the second optical signal, the receiving device 204 is the target receiving device. The optical communication system may include one or more target receiving devices. Correspondingly, the output port of the OXC device 202 connected to the target receiving device is a target output port. For example, when the receiving device 204 is the target receiving device, the output port 2 of the OXC device 202 is the target output port.

Figures 7, 8:
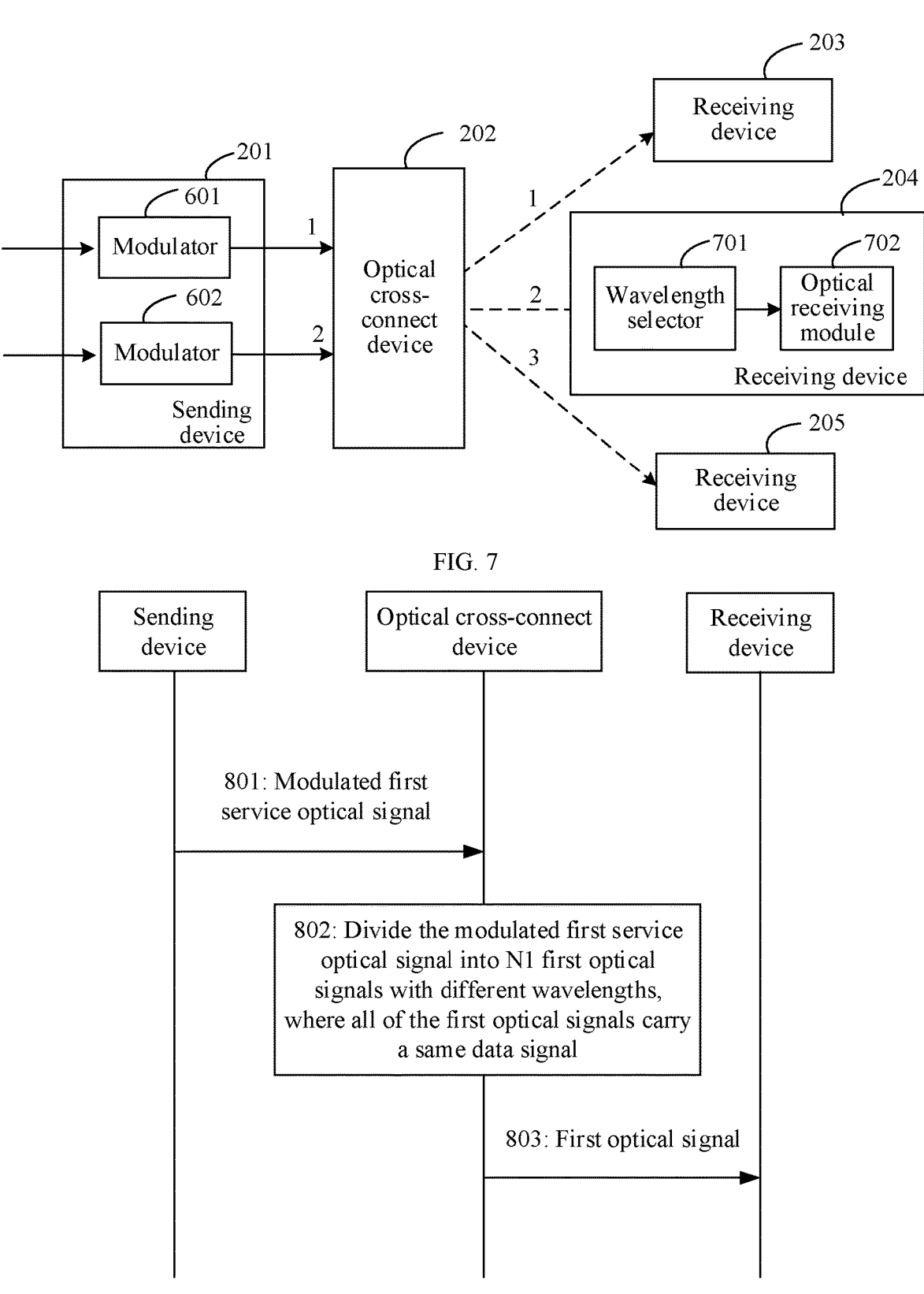
FIG. 7 is a schematic structural diagram of an optical communication system including a second wavelength selector according to this application.
FIG. 8 is a schematic flowchart of an optical communication method according to this application.

For the target receiving device, the target receiving device may need to obtain only the first optical signal or the second optical signal. Therefore, the target receiving device may perform filtering processing on the target optical signal by using the wavelength selector. FIG. 7 is a schematic structural diagram of an optical communication system including a second wavelength selector according to this application. As shown in FIG. 7, the optical communication system includes a sending device 201, an OXC device 202, a receiving device 203, a receiving device 204, and a receiving device 205. The sending device 201 includes a modulator 601 and a modulator 602. The receiving device 204 includes a wavelength selector 701 (also referred to as the second wavelength selector) and an optical receiving module 702.

For descriptions of FIG. 7, refer to the foregoing related descriptions in FIG. 6, FIG. 5, FIG. 4, and FIG. 2. When the receiving device 204 is the target receiving device, the output port 2 of the OXC device 202 is configured to send a target optical signal with two wavelengths to the target receiving device. The target optical signal includes one first optical signal and one second optical signal. After the wavelength selector 701 receives the target optical signal, the wavelength selector 701 is configured to perform filtering processing on the target optical signal to obtain the first optical signal or the second optical signal. The wavelength selector 701 is configured to send the obtained first optical signal or the obtained second optical signal to the optical receiving module 702. The optical receiving module 702 is configured to demodulate the first optical signal or the second optical signal to obtain an electrical signal.

FIG. 7 illustrates that the receiving device 204 includes the second wavelength selector. During actual application, any one or more receiving devices in the optical communication system may include the second wavelength selector. It should be understood that, when the optical communication system does not include a first wavelength selector or the second wavelength selector, the optical communication system may prevent, by using a transfer or filtering function of the OXC device 202, the receiving device from receiving the target optical signal. When the optical communication system includes the first wavelength selector but does not include the second wavelength selector, the optical communication system may prevent, by using the first wavelength selector, the receiving device from receiving the target optical signal. When the optical communication system does not include the first wavelength selector but includes the second wavelength selector, the optical communication system may prevent, by using the second wavelength selector, the optical receiving module of the receiving device from receiving the target optical signal. Therefore, the optical communication system may include the first wavelength selector and/or the second wavelength selector.

In another embodiment, when the receiving device is not used as the target receiving device, the second wavelength selector may be used as a blocking filter, and is configured to block the first optical signal.

It should be understood that, in the embodiment in FIG. 6 or FIG. 7, the OXC device 202 includes two input ports. During actual application, the OXC device 202 may include more input ports. For example, the OXC device 202 further includes an input port 3. The OXC device 202 is configured to receive a modulated third service optical signal through the input port 3. In this case, for the target receiving device, the target optical signal received by the target receiving device includes not only the first optical signal and the second optical signal, but also a third optical signal.

The foregoing describes the optical communication system in this application, and the following describes an optical communication method in this application. FIG. 8 is a schematic flowchart of an optical communication method according to this application. As shown in FIG. 8, the optical communication method includes the following steps.

Step 801: A sending device sends a modulated first service optical signal to an OXC device. The modulated first service optical signal has N1 different wavelengths, and N1 is an integer greater than 1. For descriptions of the sending device, refer to related descriptions of the sending device in FIG. 2 and FIG. 4 to FIG. 7.

Step 802: The OXC device divides the modulated first service optical signal into N1 first optical signals with different wavelengths. Each of the first optical signals is a single-wavelength optical signal, and all of the first optical signals carry a same data signal. For descriptions of the OXC device, refer to related descriptions of the OXC device in FIG. 2 to FIG. 4, FIG. 6, and FIG. 7.

Step 803: The OXC device sends M1 first optical signals in the N1 first optical signals to a first receiving device through M1 first output ports. For descriptions of the first receiving device, refer to related descriptions of the first receiving device in FIG. 2 to FIG. 4, FIG. 6, and FIG. 7.

In another embodiment, each device in the optical communication method is further configured to perform all or some operations that can be performed by the device in the foregoing optical communication system.

For example, before the sending device sends the modulated first service optical signal to the OXC device, the sending device receives an optical signal with H different wavelengths. The sending device obtains a first service optical signal based on the optical signal with the H different wavelengths. The first service optical signal has N1 different wavelengths, and H is an integer greater than N1. The sending device modulates the first service optical signal to obtain the modulated first service optical signal.

For example, the sending device sends a modulated second service optical signal to the OXC device. The modulated second service optical signal has N2 different wavelengths, and N2 is an integer greater than 1. The OXC device receives the modulated second service optical signal through a second input port, and divides the modulated second service optical signal into N2 second optical signals with different wavelengths. The OXC device sends M2 second optical signals in the N2 second optical signals to a second receiving device through M2 second output ports. Each of the second optical signals is a single-wavelength optical signal, all of the second optical signals carry a same data signal, and each of the second optical signals and each of the first optical signals carry different data signals.

FIG. 9 is another schematic flowchart of an optical communication method according to this application. As shown in FIG. 9, the optical communication method includes the following steps.

Step 901: An OXC device receives a modulated first service optical signal. The OXC device receives the modulated first service optical signal from a sending device through a first input port. The modulated first service optical signal has N1 different wavelengths, and N1 is an integer greater than 1.

Step 902: The OXC device divides the modulated first service optical signal into N1 first optical signals with different wavelengths. Each of the first optical signals is a single-wavelength optical signal, and all of the first optical signals carry a same data signal.

Step 903: The OXC device sends M1 first optical signals in the N1 first optical signals to a first receiving device through M1 first output ports.

For descriptions of the sending device, refer to related descriptions of the sending device in FIG. 2 and FIG. 4 to FIG. 7. For descriptions of the first receiving device and the OXC device, refer to related descriptions of the first receiving device and the OXC device in FIG. 2 to FIG. 4, FIG. 6, and FIG. 7.

In another embodiment, the OXC device is further configured to perform all or some operations that can be performed by the OXC device in the foregoing optical communication system or optical communication method. For example, the OXC device selects the M1 first output ports from output ports of the OXC device to send the M1 first optical signals. For example, the OXC device receives a modulated second service optical signal through a second input port. The modulated second service optical signal has N2 different wavelengths, and N2 is an integer greater than 1. The OXC device divides the modulated second service optical signal into N2 second optical signals with different wavelengths. Each of the second optical signal is a single-wavelength optical signal, and all of the second optical signals carry a same data signal. Each of the second optical signals and each of the first optical signals carry different data signals. The OXC device sends M2 second optical signals in the N2 second optical signals to a second receiving device through M2 second output ports.

The foregoing describes the optical communication method in this application, and the following describes an optical communication apparatus in this application. FIG. 10 is a schematic structural diagram of an optical communication apparatus according to this application.

As shown in FIG. 10, the optical communication apparatus includes a receiving module 1001, a wavelength division module 1002, and a sending module 1003. The receiving module 1001 may be a receiving port. The sending module 1003 may be a sending port. The wavelength division module 1002 may be a wavelength divider. The wavelength divider may be a wavelength demultiplexer, a grating, a WSS, an AWG, or the like.

The receiving module 1001 is configured to receive a modulated first service optical signal through a first input port. The modulated first service optical signal has N1 different wavelengths, and N1 is an integer greater than 1. The wavelength division module 1002 is configured to divide the modulated first service optical signal into N1 first optical signals with different wavelengths. Each of the first optical signals is a single-wavelength optical signal, and all of the first optical signals carry a same data signal. The sending module 1003 is configured to send M1 first optical signals in the N1 first optical signals to a first receiving device through M1 first output ports.

In another embodiment, the optical communication apparatus may further include a selection module or the like. The module in the optical communication apparatus is configured to perform all or some operations that can be performed by the OXC device in embodiments corresponding to FIG. 2 to FIG. 9.

The following describes an OXC device provided in this application. FIG. 11 is a schematic structural diagram of an OXC device according to this application. As shown in FIG. 11, the OXC device includes a first input port 1101, a wavelength divider 1102, an OXC structure 1103, a first output port 1104, and a controller 1105. The wavelength divider 1102 may be a wavelength demultiplexer, a grating, a WSS, an AWG, or the like. When the OXC device is the WSS, the OXC structure 1103 may be an LCOS. When the OXC device is a cascaded WSS, the OXC structure 1103 may be an optical backplane. When the OXC device is a combination of an AWG and a MEMS, the OXC structure 1103 may be the MEMS. The controller 1105 may be a server configured for control, a control module located in a network adapter, or a control board.

The first input port 1101 is configured to receive a modulated first service optical signal. The modulated first service optical signal has N1 different wavelengths, and N1 is an integer greater than 1. The wavelength divider 1102 is configured to divide the modulated first service optical signal into N1 first optical signals with different wavelengths. Each of the first optical signals is a single-wavelength optical signal, and all of the first optical signals carry a same data signal. The controller 1105 is configured to receive or generate a control signal, and control the OXC structure 1103 based on the control signal, to enable the first input port to be connected to M1 first output ports 1104 by using the OXC structure 1103. In an example, the controller 1105 may change angles of some reflection elements in the OXC structure 1103 by using the control signal, to control the first input port to be connected to the M1 first output ports 1104. For example, the controller 1105 controls grayscale distribution on the LCOS based on the control signal. The M1 first output ports 1104 are configured to output M1 first optical signals in the N1 first optical signals.

In another embodiment, for descriptions of the OXC device, refer to related descriptions of the OXC device in FIG. 2 to FIG. 4, FIG. 6, and FIG. 7. For example, the OXC device further includes a second input port, and the second input port is configured to receive a modulated second service optical signal. For example, the wavelength divider 1102 may be the input WSS 1 in FIG. 3A. For example, the OXC structure 1103 may be the OXC structure 301 in FIG. 3A.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. An optical communication system, comprising:
a sending device configured to transmit a modulated first service optical signal, wherein the modulated first service optical signal has N1 wavelengths, and wherein N1 is an integer greater than 1;
an optical cross-connect (OXC) device comprising:
a first input port;
M1 first output ports, wherein M1 is an integer greater than 1; and
a first modulator that is an external modulator, wherein the first modulator is configured to:
receive the first service optical signal; and
modulate the first service optical signal to obtain the modulated first service optical signal, and wherein the OXC device is configured to:

receive the modulated first service optical signal through the first input port;
divide the modulated first service optical signal into N1 first optical signals with different wavelengths of the N1 wavelengths; and
transmit M1 second optical signals in the N1 first optical signals through the M1 first output ports, wherein each of the M1 second optical signals is a single-wavelength optical signal, and wherein all of the M1 second optical signals carry a same data signal; and
a first receiving device configured to receive the M1 second optical signals, and wherein the sending device further comprises a first wavelength selector that is configured to:
receive a third optical signal with H different wavelengths, wherein H is an integer greater than N1; and
send a first service optical signal based on the third optical signal, wherein the first service optical signal has N1 different wavelengths.

2. The optical communication system of claim 1, wherein the OXC device is further configured to select the M1 first output ports from a subset of output ports of the OXC device to send the M1 second optical signals.

3. The optical communication system of claim 1, wherein the optical communication system further comprises a second receiving device configured to send a modulated second service optical signal to the OXC device, wherein the modulated second service optical signal has N2 different wavelengths, wherein N2 is an integer greater than 1, wherein the OXC device further comprises a second input port and M2 second output ports, wherein M2 is an integer greater than 1, and wherein the OXC device is further configured to:
receive the modulated second service optical signal through the second input port;
divide the modulated second service optical signal into N2 third optical signals with different wavelengths; and
transmit M2 fourth optical signals in the N2 third optical signals to the second receiving device through the M2 second output ports, wherein each of the M2 fourth optical signals has a single-wavelength, wherein all of the M2 fourth optical signals carry the same data, and wherein each of the M2 fourth optical signals is a different data signal than the M1 second optical signals.

4. The optical communication system of claim 3, wherein the OXC device is further configured to select the M2 second output ports from a subset or all output ports of the OXC device to send the M2 fourth optical signals, and wherein the M1 first output ports and the M2 second output ports comprise a same port or different ports.

5. The optical communication system of claim 3, wherein a target receiving device is the first receiving device and the second receiving device, and wherein the target receiving device comprises:
a second wavelength selector configured to:
receive a target optical signal with two different wavelengths from target output ports, wherein the target output ports is one or more of the M1 first output ports and the M2 second output ports, wherein the target optical signal comprises a fifth optical signal and a sixth optical signal; and
transmit the fifth optical signal or the sixth optical signal; and
an optical receiver configured to receive the fifth optical signal or the sixth optical signal.

6. The optical communication system of claim 5, wherein the second wavelength selector is further configured to obtain the fifth optical signal or the sixth optical signal based on the target optical signal.

7. The optical communication system of claim 3, wherein the OXC device is further configured to select the M2 second output ports from a subset or all output ports of the OXC device to send the M2 fourth optical signals, wherein the M1 first output ports and the M2 second output ports are different ports.

8. The optical communication system of claim 1, wherein the optical communication system is an integrated data communication network (DCN) system.

9. The optical communication system of claim 1, wherein the OXC device is further configured to select the M1 first output ports from all output ports of the OXC device to send the M1 second optical signals.

10. An optical communication method, comprising:

receiving, by an optical cross-connect (OXC) device through a first input port, a modulated first service optical signal, wherein the modulated first service optical signal has N1 different wavelengths, and wherein N1 is an integer greater than 1;

dividing, by the OXC device, the modulated first service optical signal into N1 first optical signals with N1 different wavelengths, wherein each of the N1 first optical signals is a single-wavelength optical signal, and wherein all of the N1 first optical signals carry a same data signal;

transmitting, by the OXC device through M1 first output ports, M1 second optical signals in the N1 first optical signals to a first receiving device, wherein M1 is an integer greater than 1;

receiving, by the OXC device, a modulated second service optical signal through a second input port of the OXC device, wherein the modulated second service optical signal has N2 different wavelengths, and wherein N2 is an integer greater than 1;

dividing, by the OXC device, the modulated second service optical signal into N2 third optical signals with different wavelengths, wherein each of the N2 third optical signals has a single-wavelength, wherein all of the N2 third optical signals carry the same data, and wherein each of the N2 third optical signals is a different data signal than the M1 second optical signals; and transmitting, by the OXC device, M2 fourth optical signals in the N2 third optical signals to a second receiving device through M2 second output ports, wherein M2 is an integer greater than 1.

11. The optical communication method of claim 10, further comprising selecting, by the OXC device, the M1 first output ports from a subset or all output ports of the OXC device to send the M1 second optical signals.

12. The optical communication method of claim 10, further comprising selecting, by the OXC device, the M2 second output ports from a subset or all output ports of the OXC device to send the M2 fourth optical signals, wherein the M1 first output ports and the M2 second output ports are same ports or different ports.

13. The optical communication method of claim 10, wherein transmitting, by the OXC device, the M1 second optical signals comprises:

transmitting, by the OXC device, a target optical signal with two different wavelengths to a target receiving device from target output ports of the OXC device to enable the target receiving device to obtain a fifth optical signal or a sixth optical signal from the target optical signal, wherein the target output ports one or more of the M1 first output ports and the M2 second output ports, wherein the target optical signal comprises the fifth optical signal and the sixth optical signal, and wherein the target receiving device is the first receiving device and the second receiving device.

14. An optical communication method, comprising:

receiving, by a sending device, a first optical signal with H different wavelengths;

obtaining, by the sending device, a first service optical signal based on the first optical signal, wherein the first service optical signal has N1 different wavelengths, and wherein H is an integer greater than N1;

modulating, by the sending device, the first service optical signal to obtain a modulated first service optical signal;

transmitting, by the sending device, the modulated first service optical signal, wherein the modulated first service optical signal has N1 wavelengths, and wherein N1 is an integer greater than 1;

receiving, by an optical cross-connect (OXC) device, the modulated first service optical signal through a first input port of the OXC device;

dividing, by the OXC device, the modulated first service optical signal into N1 first optical signals with different wavelengths of the N1 wavelengths; and transmitting, by the OXC device, M1 second optical signals in the N1 first optical signals to a first receiving device through M1 first output ports of the OXC device, wherein M1 is an integer greater than 1, wherein each of the M1 second optical signals is a single-wavelength optical signal, and wherein all of the M1 second optical signals carry a same data signal.

15. The optical communication method of claim 14, wherein before transmitting the M1 second optical signals, the optical communication method further comprises selecting, by the OXC device, the M1 first output ports from a subset or all output ports of the OXC device to send the M1 second optical signals.

16. The optical communication method of claim 14, further comprising:

transmitting, by the sending device, a modulated second service optical signal to the OXC device, wherein the modulated second service optical signal has N2 different wavelengths, and wherein N2 is an integer greater than 1;

receiving, by the OXC device, the modulated second service optical signal through a second input port of the OXC device;

dividing, by the OXC device, the modulated second service optical signal into N2 third optical signals with different wavelengths; and transmitting, by the OXC device, M2 fourth optical signals to a second receiving device through M2 second output ports of the OXC device, wherein each of the M2 fourth optical signals has a single-wavelength, wherein all of the M2 fourth optical signals carry the same data, and wherein each of the M2 fourth optical signals is a different data signal than the M1 second optical signals.

17. The optical communication method of claim 16, further comprising selecting, by the OXC device, the M2 second output ports from a subset or all output ports of the OXC device to send the M2 fourth optical signals, wherein the M1 first output ports and the M2 second output ports comprise a same port.

18. The optical communication method of claim 16, further comprising receiving, by a target receiving device, a target optical signal with two different wavelengths from target output ports, wherein the target output ports is one or more of the M1 first output ports and the M2 second output ports, wherein the target receiving device is the first receiving device and the second receiving device, and wherein the target optical signal comprises a fifth optical signal and a sixth optical signal.

19. The optical communication method of claim 18, further comprising obtaining, by the target receiving device, the fifth optical signal or the sixth optical signal based on the target optical signal.

20. The optical communication method of claim 16, further comprising selecting, by the OXC device, the M2 second output ports from a subset or all output ports of the OXC device to send the M2 fourth optical signals, wherein the M1 first output ports and the M2 second output ports are different ports-ports.

\* \* \* \* \*